United States Patent
Van Arendonk et al.

(10) Patent No.: US 7,332,701 B2
(45) Date of Patent: Feb. 19, 2008

(54) DUAL-MODE CMOS IMAGING SENSOR WITH SUPPORTING LED

(75) Inventors: Anton Petrus Maria Van Arendonk, Eindhoven (NL); Nicolaas Johannes Anthonius Van Veen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/514,287

(22) PCT Filed: Apr. 22, 2003

(86) PCT No.: PCT/IB03/01678

§ 371 (c)(1),
(2), (4) Date: Nov. 12, 2004

(87) PCT Pub. No.: WO03/098920

PCT Pub. Date: Nov. 27, 2003

(65) Prior Publication Data

US 2005/0224691 A1    Oct. 13, 2005

(30) Foreign Application Priority Data

May 16, 2002    (EP) .................................. 02076914

(51) Int. Cl.
| | |
|---|---|
| *H01L 27/00* | (2006.01) |
| *H01L 27/14* | (2006.01) |
| *H01L 31/0203* | (2006.01) |
| *H01L 23/02* | (2006.01) |
| *H01L 21/00* | (2006.01) |
| *H01J 40/14* | (2006.01) |
| *H04N 3/14* | (2006.01) |

(52) U.S. Cl. .................. 250/208.1; 250/221; 348/294; 257/431; 257/433; 257/678; 438/57; 438/64

(58) Field of Classification Search ............. 250/208.1, 250/226, 221; 257/431–434, 678; 438/57, 438/64, 65, 66, 69, 70, 73, 75; 348/294–324
See application file for complete search history.

(56) References Cited

U.S. PATENT DOCUMENTS

| | | | |
|---|---|---|---|
| 4,507,674 A | 3/1985 | Gaalema | ....................... 357/30 |
| 4,653,478 A | 3/1987 | Nagasaki | |

(Continued)

FOREIGN PATENT DOCUMENTS

EP    0 509 640 A2    10/1992

(Continued)

*Primary Examiner*—Que Tan Le
*Assistant Examiner*—Pascal M Bui-Pho
(74) *Attorney, Agent, or Firm*—Paul Im

(57) ABSTRACT

The present invention relates to a sensor device for sensing an image of an object, wherein a detection means (14) for detecting radiation received from the object is supported by a light-emitting semiconductor means (12) for emitting radiation towards said object during a predetermined operation period of the detection means (14). The detection means (14) can be operated even at low light intensity conditions and at a low power consumption. The detection means (14) may be a two-side illuminated detection means, wherein one side is supported by the light-emitting semiconductor means (12) and the other side is a back-etched side with increased sensitivity. A cheap and very small multi-purpose camera or sensor module can thereby be provided.

6 Claims, 1 Drawing Sheet

U.S. PATENT DOCUMENTS

Figure 1:
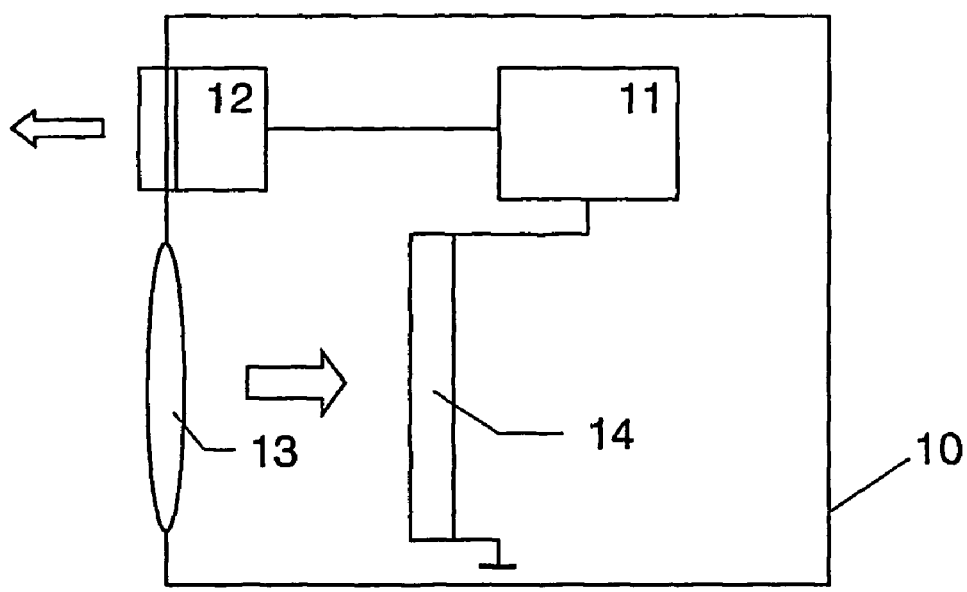

| | | | |
|---|---|---|---|
| 4,694,317 A | * | 9/1987 | Higashi et al. ............. 257/446 |
| 6,095,661 A | * | 8/2000 | Lebens et al. .............. 362/184 |
| 6,168,965 B1 | | 1/2001 | Malinovich et al. .......... 438/66 |
| 6,191,404 B1 | * | 2/2001 | Poole et al. ............. 250/206.2 |
| 2002/0027189 A1 | * | 3/2002 | Murakami et al. ....... 250/208.1 |

FOREIGN PATENT DOCUMENTS

| | | |
|---|---|---|
| EP | 0 710 039 A2 | 5/1996 |
| GB | 2 323 664 A | 9/1998 |

* cited by examiner

DUAL-MODE CMOS IMAGING SENSOR WITH SUPPORTING LED

The present invention relates to a sensor device for sensing an image of an object, such as a CMOS (Complementary Metal Oxide Semiconductor) image sensor.

Solid-state image sensors are used in, for example video cameras, and are currently realized in a number of forms including charge coupled devices (CCDs) and CMOS image sensors. These image sensors are based on a two-dimensional array of pixels. Each pixel includes a sensing element which is capable of converting a portion of an optical image into an electronic signal. These electronic signals are then used to regenerate the optical image on, for example, a display.

More recently, however, CMOS image sensors have gained popularity. Pure CMOS image sensors have benefited from advances in CMOS technology for microprocessors and ASICs (Application Specific Integrated Circuits) and provide several advantages over CCD image sensors. Shrinking lithography, coupled with advanced signal processing algorithms, sets the stage for sensor array, array control and image processing on one chip produced by using these well-established CMOS techniques. However, pixels cannot shrink too much, or they have an insufficient light-sensitive area Nonetheless, shrinking lithography provides reduced metal line widths that connect transistors and buses in the array. In front side-illuminated image sensors, this reduction of metal line-width exposes more silicon to light, thereby increasing light sensitivity. CMOS image sensors also provide greater power savings, because they require fewer power-supply voltages than CCD image sensors. In addition, due to modifications to CMOS pixels, newly developed CMOS image sensors provide high-resolution, low-noise images.

In CMOS pixel-array constructions, active or passive pixels can be used. Active-pixel sensors (APSs) include amplification circuitry in each pixel. CMOS active-pixel sensors overcome passive-pixel deficiencies by including active circuits, e.g. transistors, in each pixel. An APS cell operates in an integration and readout phase which is controlled by signals received on a reset control line and row select control line. A reset transistor is pulsed on and off during the integration phase. This reset process causes the potential of a corresponding photodiode to float at a reset level. The photodiode inherently includes capacity to store an amount of charge proportional to the radiation intensity reflected from an object. The photo-generated current discharges the pixel capacitance and causes the potential of the photodiode to decrease to the signal value which is dictated by the amount of photo-generated current The difference between the reset level and the signal level is then proportional to the incident light and constitutes the video signal.

A problem associated with front side-illuminated CMOS APS cells is that the active circuits, and in particular the metal lines associated with the active circuits, reduce the fill factor, i.e. the ratio of light-sensing area to total pixel area of CMOS APS pixel arrays. In particular, reset control lines, row select control lines, voltage source lines, metal lines and column output lines are all formed in a silicon-dioxide insulation layer located over the substrate. Light, in the form of photons, passes through the insulation layer to a light-sensitive diffusion region, thereby producing a photovoltaic reaction. The presence of the metal and polysilicon lines associated with the active circuits reduces the amount of light that reaches the photodiode diffusion region, thereby producing a non-optimal fill factor.

As mentioned above, the reduction of metal-line width associated with cutting edge CMOS fabrication processes exposes more silicon to light. However, even very thin metal lines produce some light blockage, thereby preventing front side-illuminated image sensors from achieving a 100% fill factor.

In the current market situation, sensors have to be able to operate within their specification at light intensities down to only 30 lux. However, due to the above problems, the sensitivity of the CMOS sensors is too low and much development has to be performed to meet required specifications at these low light intensities.

It is therefore an object of the present invention to provide an improved image sensor device which can be operated at low light intensities.

This object is achieved by a sensor device as defined in claim 1. Accordingly, the light-emitting semiconductor means are arranged to support the sensor device during snapshots and/or during short video conference periods. Thereby, the operational condition of the sensor is increased in such a manner that the image quality will increase and that efforts to improve the sensor on sensitivity can be released.

Preferably, the light-emitting semiconductor means may comprise at least one light-emitting diode.

Furthermore, the predetermined operation time period may correspond to an integration period of the detection means.

According to an advantageous further development, the detection means may comprise a first detection surface and a second detection surface, wherein the light-emitting semiconductor means are arranged to emit radiation towards an object whose image is to be detected by a predetermined one of said first and second detection surfaces. In this case, the first detection surface may be a front side of the detection means and the second detection surface may be a back-etched rear side of the detection means, wherein the front side corresponds to the predetermined one of the first and second detection surfaces. Thereby, two sensor functions can be provided by using the detection means at two sides, e.g. front side and rear side, while only one sensor is needed. Due to the different sensitivities of the front side and rear side, the sensor may cover several applications. Thus, a cheap and very small camera or sensor module can be provided. Furthermore, the directing means may comprise a first lens for directing radiation to the first detection surface and a second lens for directing radiation to the second surface. The first and second lenses may be mounted at opposite walls of a housing of the sensor device.

Further developments are defined in the dependent claims.

Figure 2:
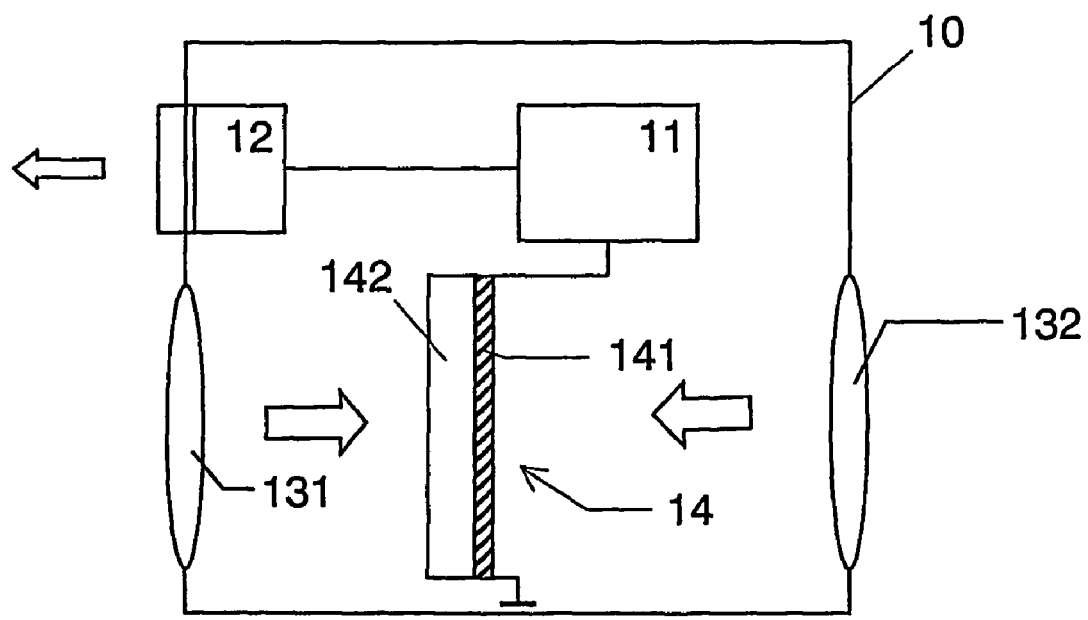

In the following, the present invention will be described in greater detail on the basis of preferred embodiments with reference to the accompanying drawings in which:

FIG. 1 is a schematic block diagram of an image sensor device according to a first preferred embodiment; and FIG. 2 is a schematic block diagram of a two-side illuminated image sensor according to a second preferred embodiment.

The preferred embodiment will now be described on the basis of a CCD image sensor device which may be used in sensor and/or camera modules e.g. for mobile phones or the like.

FIG. 1 is a schematic block diagram of a sensor or camera module according to a first preferred embodiment of the present invention, which comprises a housing 10 in which a CMOS sensor 14 with a matrix array of sensing elements, and a control circuit 11 are arranged. The control circuit 11 is arranged to provide the control signals required for controlling the readout operation of the CMOS sensor 14 and for supplying power to the CMOS sensor 14. Furthermore, a light-emitting diode (LED) device 12 is mounted at the receiving wall of the housing 10 towards which the radiation of an object to be detected by the CMOS sensor 14 is directed. Additionally, an optical lens 13 is mounted in a corresponding opening of the receiving wall, through which the radiation passes in order to be directed towards a detection surface of the CMOS sensor 14. This arrangement provides the advantage that an object to be sensed by the CMOS sensor 14 can be illuminated or radiated by the LED device 12 so as to support the CMOS sensor 14 during snapshots or during short video sensing periods. The image sensor can then be operated even at low light intensities.

By using a LED device with a high efficiency, as recently developed, the power consumption can be maintained at a low level. In particular, the LED device 12 may comprise a high-power Trunkated-Inverted-Pyramid (TIP) AlGaInP/GaP LED, a high-power TS AlGaInP LED or a high-flux LED array comprising a combination of AlInGaP LEDs and InGaN LEDs. Such LED devices provide increased luminous efficiencies over 50 lumens/watt.

The power consumption may be further reduced by activating the LED device 12 only during the integration period of the CMOS sensor 14. Therefore, a corresponding control signal may be supplied from the control circuit 11 to the LED device 12. Furthermore, a lens system (not shown) may be provided at the front side of the LED device 12 for directing the support radiation towards the object to be sensed by the CMOS sensor 14.

Consequently, a good image quality can be achieved by the sensor device, even at low light intensity levels and low power consumption.

Potentially, both front side and rear side CMOS image sensor ICs (integrated circuits) can be used as the CMOS sensor 14, provided that sufficient light, incident at the rear side of the integrated circuit, can pass through the substrate. To improve sensitivity, the substrate could be etched away as much as possible. However, this may probably may not be sufficient to achieve an acceptable performance of the CMOS sensor 14 at low light intensity conditions. Therefore, support by the LED device 12 is required in both cases.

FIG. 2 is a schematic block diagram of a two-side illuminated sensor or camera module according to an enhanced second preferred embodiment of the present invention. It is noted that components or elements denoted by the same reference numerals correspond to the respective components or elements of the first preferred embodiment, such that a detailed description thereof is omitted here. In the second preferred embodiment, the CMOS sensor 14 can be illuminated from the front side and the rear side, and two lenses 131, 132 are mounted at respective openings of opposite walls of the housing 10. Thus, the sensor or camera module can be used for sensing images of objects arranged at opposite sides of the module, or the sensitivity or application of the image sensing operation can be controlled by changing the sensing side of the module, i.e. by turning the module. Thus, both sides of the sensor device can be used to thereby obtain a cheap and very small camera or sensor module for a wide range of applications. For example, in mobile phones, customers want to have two sensors in each mobile phone to cover snapshot and videoconferencing capabilities. By applying two lenses at each side of the two-sided illuminated CCD sensor 14, the mobile phone can cover all applications, while maintaining a small size. A cheap and very small camera module can thereby be provided. Furthermore, the LED device 12 may be a quickly switchable highly efficient LED, e.g. a bright white device having a low driving voltage.

The rear side lens might be a CSM (Cassegrain Schmidt Mangin) lens. As such, a CSM lens is not applicable with microlenses, but should be used at that particular side of the device.

The CMOS sensor 14 indicated in FIG. 2 comprises a glass substrate 142 and a thinned or back-etched sensor layer 141. Examples of back-illuminated CMOS sensors are described e.g. in documents U.S. Pat. Nos. 6,168,965 and 4,507,674. In such CMOS sensors, material is removed from the rear surface of a wafer until the light-sensitive pixel region of image sensor circuits is effectively exposed through the rear surface. Thus, the pixel of each light-sensitive pixel region generates an electron flow in response to light (photons) passing through the rear surface. The initially described fill factor problems of front side-illuminated CMOS sensors can thereby be alleviated to achieve a 100% fill factor. Thus, the detecting surface at the back-etched sensor layer 141 has a higher light sensitivity than the detection surface at the glass substrate 142. However, the reduced sensitivity at the front side detection surface is supported by the LED device 12 to thereby overcome the sensitivity issue at the normal side of the CMOS sensor 14.

Due to the fact that the support radiation by the LED device 12 leads to an increased power consumption and/or may be less desirable for longer operation periods, the front side of the CMOS sensor 14 may be used for short snapshots, while the rear detection surface can be used for video sequences at a high sensitivity due to the 100% fill factor of the pixel array.

Also in the second preferred embodiment, the control circuit 11 may be arranged to activate the LED device 12 only during the integration period of the CMOS sensor 14. Consequently, in the second preferred embodiment, a sensor or camera module for personal computer cameras, digital still cameras (DSCs), videoconferencing, mobile phones, etc. can be provided.

It is noted that the present invention is not restricted to the above preferred embodiments, and can be used in any image sensing device to enable operation even at low light intensities. The LED device 12 may be replaced by other low-power light-emitting semiconductor devices, such as a laser diode which may be scanned over the object to provide the radiation support. Furthermore, any kind of radiation sensor or radiation detector may be used in the device. The preferred embodiments may thus vary within the scope of the attached claims.

The invention claimed is:

1. A sensor device for sensing an image of an object, said sensor device comprising:
    a) a CMOS detector for detecting a radiation received from said object, said CMOS detector comprises a first detection surface and a second detection surface;
    b) a director for directing said received radiation towards a detection surface of said CMOS detector; and
    c) a light-emitting semiconductor which emits radiation toward said object during a predetermined operation period of said CMOS detector, wherein said light-emitting semiconductor is arranged to emit radiation towards an object whose image is to be detected by a predetermined one of said first and second detection surfaces, said predetermined one of said first and second detection surfaces having a lower sensitivity than the other detection surface and said first detection surface is at a front side of said CMOS detector and said second detection surface is at a back-etched rear side of said CMOS detector and wherein said front side corresponds to said predetermined one of said first and second detection surfaces.

2. A sensor device as claimed in claim 1, wherein said light-emitting semiconductor comprises at least one light-emitting diode.

3. A sensor device according to claim 1, wherein said predetermined operation time period corresponds to an integration period of said CMOS detector.

4. A sensor device for sensing an image of an object, said sensor device comprising:
   a) a CMOS detector for detecting a radiation received from said object, said CMOS detector comprises a first detection surface and a second detection surface;
   b) a director for directing said received radiation towards a detection surface of said CMOS detector, wherein said director comprises a first lens arrangement for directing radiation to said first detection surface and a second lens arrangement for directing radiation to said second detection surface, said first and second lens arrangement are mounted at opposite walls of a housing of said sensor device; and
   c) a light-emitting semiconductor which emits radiation toward said object during a predetermined operation period of said CMOS detector, wherein said light-emitting semiconductor is arranged to emit radiation towards an object whose image is to be detected by a predetermined one of said first and second detection surfaces, said predetermined one of said first and second detection surfaces having a lower sensitivity than the other detection surface.

5. A sensor device as claimed in claim 4, wherein said light-emitting semiconductor comprises at least one light-emitting diode.

6. A sensor device according to claim 4, wherein said predetermined operation time period corresponds to an integration period of said CMOS detector.

* * * * *